US012643068B2

(12) United States Patent
Weinberger et al.

(10) Patent No.: US 12,643,068 B2
(45) Date of Patent: Jun. 2, 2026

(54) ADSORBENT MATERIAL FOR REMOVING NITROGEN OXIDES FROM INDOOR OR CABIN AIR

(71) Applicant: BASF CORPORATION, Florham Park, NJ (US)

(72) Inventors: David S. Weinberger, Iselin, NJ (US); Howard J. Furbeck, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 477 days.

(21) Appl. No.: 18/031,965

(22) PCT Filed: Oct. 21, 2021

(86) PCT No.: PCT/US2021/056053
§ 371 (c)(1),
(2) Date: Apr. 14, 2023

(87) PCT Pub. No.: WO2022/087265
PCT Pub. Date: Apr. 28, 2022

(65) Prior Publication Data
US 2023/0381708 A1 Nov. 30, 2023

Related U.S. Application Data

(60) Provisional application No. 63/104,347, filed on Oct. 22, 2020.

(51) Int. Cl.
*B01D 53/04* (2006.01)
*B01J 20/02* (2006.01)
(Continued)

(52) U.S. Cl.
CPC ...... *B01D 53/0438* (2013.01); *B01J 20/0248* (2013.01); *B01J 20/06* (2013.01);
(Continued)

(58) Field of Classification Search
CPC .......... B01D 53/0438; B01D 2253/108; B01D 2253/1124; B01D 2253/3425; B01D 2257/404; B01D 2259/4508; B01D 2253/102; B01D 2253/104; B01D 2253/106; B01D 2253/1085;
(Continued)

(56) References Cited

U.S. PATENT DOCUMENTS 5,158,582 A * 10/1992 Onitsuka ............ B01D 53/9481
95/122
6,068,824 A 5/2000 Kinoshita et al.
(Continued)

FOREIGN PATENT DOCUMENTS

WO 2020/086525 A1 4/2020
WO 2022/011217 A1 4/2022

OTHER PUBLICATIONS

International Search Report and Written Opinion of International Application No. PCT/US2021/056053 mailed Mar. 9, 2022, 13 pgs.

*Primary Examiner* — Frank M Lawrence, Jr.
(74) *Attorney, Agent, or Firm* — Lowenstein Sandler LLP

(57) ABSTRACT

Disclosed in certain embodiments are systems for removing pollutants, such as nitrogen oxides, from an interior air flow, which may include an adsorbent material that includes a zeolite and a basic metal oxide.

17 Claims, 5 Drawing Sheets

Material Comparison

(51) Int. Cl.
| | |
|---|---|
| *B01J 20/06* | (2006.01) |
| *B01J 20/16* | (2006.01) |
| *B01J 20/22* | (2006.01) |
| *G01N 33/00* | (2006.01) |

(52) U.S. Cl.
CPC ............. *B01J 20/165* (2013.01); *B01J 20/22* (2013.01); *B01D 2253/108* (2013.01); *B01D 2253/1124* (2013.01); *B01D 2253/3425* (2013.01); *B01D 2257/404* (2013.01); *B01D 2259/4508* (2013.01)

(58) Field of Classification Search
CPC ........ B01D 2258/06; B01D 2259/4566; B01D 2259/4575; B01D 53/0407; B01D 53/02; B01D 53/04; B01D 46/0036; B01D 2253/25; B01J 20/0248; B01J 20/06; B01J 20/165; B01J 20/22; F24F 8/15; Y02A 50/20

USPC ............. 96/154; 95/129; 423/239.1, DIG. 27
See application file for complete search history.

(56) References Cited

U.S. PATENT DOCUMENTS

| | | | | |
|---|---|---|---|---|
| 8,404,203 | B2 | 3/2013 | Bull et al. | |
| 9,233,183 | B2 | 1/2016 | Kim | |
| 2003/0108467 | A1* | 6/2003 | Tran ................... | B01D 53/8628 423/239.2 |
| 2004/0146436 | A1 | 7/2004 | Ham et al. | |
| 2015/0110696 | A1* | 4/2015 | Liu .................... | B01J 20/28057 423/230 |
| 2016/0250370 | A1* | 9/2016 | Orito ....................... | A61L 9/014 422/122 |
| 2016/0250594 | A1* | 9/2016 | Casci .................... | B01J 20/186 423/239.1 |
| 2021/0197171 | A1* | 7/2021 | Inamura ................... | B01J 23/63 |

\* cited by examiner

100

108

110    112

Filter Unit
104

Interior Air Control
System
106

Interior Space
102

210

215

220

200

220

210

ADSORBENT MATERIAL FOR REMOVING NITROGEN OXIDES FROM INDOOR OR CABIN AIR

CROSS-REFERENCE TO RELATED APPLICATION(S)

This application claims the benefit of priority of U.S. Provisional Patent Application Ser. No. 63/104,347, filed on Oct. 22, 2020, the disclosure of which is hereby incorporated by reference herein in its entirety.

TECHNICAL FIELD

The present disclosure relates to compositions, devices, and methods for air purification. More particularly, the disclosure relates to adsorbent materials, devices, and systems, methods of their preparation, and methods of their use for removal of gaseous pollutants (such as nitrogen oxides) from air.

BACKGROUND

Traditional pollutant treatment systems and sorbent materials face many challenges, including improving long term performance, increasing the efficiency of manufacturing operations, and reducing production costs. Many sorbent materials are generally adapted for one type of adsorption application, while being unable to remove other types of pollutants. Interior air purification, such as in buildings and vehicles, is one example where removal of multiple types of pollutants, such as nitrogen oxides, is critical. There continues to be a need for devices, methods, and compositions that can effectively remove and retain pollutants, particularly under ambient conditions.

SUMMARY OF THE DISCLOSURE

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a filter device, adapted for removal and retention of $NO_2$ from interior air at temperatures below 100° C., comprises: a substrate; and an adsorbent material coated onto the substrate, the adsorbent material comprising a zeolite and a basic metal oxide.

In certain embodiments, the substrate is formed from a non-metallic and non-ceramic material. In certain embodiments, the substrate is a foam substrate or a nonwoven polymeric substrate. In certain embodiments, the substrate is an aluminum substrate.

In certain embodiments, the zeolite comprises a zeolite selected from a group consisting of: AEI, BEA, BEC, CHA, EMT, FAU, FER, MFI, and combinations thereof. In certain embodiments, the zeolite comprises BEA zeolite.

In certain embodiments, the basic metal oxide comprises zinc oxide, copper oxide, or a combination thereof.

In certain embodiments, the interior air is recirculated air.

In certain embodiments, a silica-to-alumina ratio (SAR) of the beta zeolite is about 200 or greater.

In certain embodiments, a silica-to-alumina ratio (SAR) of the beta zeolite is about 300 or greater.

In certain embodiments, the oxide is present at a loading of at least about 5 wt. % based on the total weight of the adsorbent material. In certain embodiments, the oxide is present at a loading of about 5 wt. % to about 20 wt. %.

In certain embodiments, the adsorbent material further comprises a binder. In certain embodiments, the binder is a polymeric binder selected from a group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), poly(tetrafluoroethylene), polyvinylidene fluoride, poly(vinylfluoride), ethylene chlorotrifluoroethylene copolymer, polyamide, phenolic resins, polyurethane, acrylic/styrene acrylic copolymer latex, silicone polymers, and combinations thereof. In certain embodiments, the binder comprises an alumina or zirconia binder.

In certain embodiments, the adsorbent material further comprises one or more of silica gel, activated carbon, activated alumina, molecular sieves, resins, or catalytic material.

In certain embodiments, the filter device is incorporated into an interior air control system selected from a building heating, ventilation and air conditioning (HVAC) system, an aircraft environmental control system, a non-aircraft vehicle ventilation system, and an indoor air purifier.

In certain embodiments, the filter device is adapted for a cumulative $NO_2$ removal of greater than 120, 350, 500, or 750 milligrams per gram of the adsorbent material when contacting air at 18-23° C. with a water content of 1.5%. The cumulative $NO_2$ removal corresponds to $NO_2$ removed over a duration from initial removal efficiency of the adsorbent material until 20% of the initial removal efficiency.

In certain embodiments, the filter device is adapted for a cumulative $NO_2$ removal of greater than 30, 80, or 120 milligrams per gram of the adsorbent material when contacting air at 18-23° C. with a water content of 0.5%. The cumulative $NO_2$ removal corresponds to $NO_2$ removed over a duration from initial removal efficiency of the adsorbent material until 20% of the initial removal efficiency.

In another aspect of the present disclosure, a substrate adapted for removal and retention of $NO_2$ from interior air at temperatures below 100° C., comprises an adsorbent material coated onto at least one surface thereof, the adsorbent material comprising a zeolite and a basic metal oxide.

In certain embodiments, the substrate is incorporated into an air flow conduit.

In another aspect of the present disclosure, a method for removal and retention of $NO_2$ from an interior air flow comprises: contacting the interior air flow with an adsorbent material adapted to reduce the $NO_2$ concentration of the recirculated air supply, the adsorbent material comprising a zeolite and a basic metal oxide.

In certain embodiments, the air supply is maintained at a temperature of 10° C. to 30° C.

In certain embodiments, a desorption rate of $NO_2$ adsorbed by the adsorbent material is substantially zero below a temperature of 100° C.

In certain embodiments, the interior air flow is maintained or produced by a building heating, ventilation and air conditioning (HVAC) system, an aircraft environmental control system, non-aircraft vehicle ventilation system, or an indoor air purifier.

In another aspect of the present disclosure, an air purification system for removal and retention of $NO_2$ from interior air comprises: a substrate; and an adsorbent material coated onto the substrate, the adsorbent material comprising a beta zeolite impregnated with the basic metal oxide.

In another aspect of the present disclosure, a method of forming a filter device adapted for removal and retention of $NO_2$ from interior air comprises: forming a composite material of a zeolite with a basic metal precursor; calcining the composite material to form particles comprising the zeolite and a basic metal oxide formed from the basic metal precursor; forming a slurry comprising the particles and a binder; and coating the slurry onto a substrate to form the filter device.

In certain embodiments, the composite is formed by incipient wetness impregnation of the zeolite with the basic metal precursor.

In certain embodiments, the basic metal precursor comprises one or more of zinc acetate or copper acetate.

As used herein, the terms "adsorbent" or "adsorbent material" refer to a material that can adhere gas molecules, ions, or other species within its structure (e.g., removal of $CO_2$ from air). Specific materials include but are not limited to clays, metal organic framework, activated alumina, silica gel, activated carbon, molecular sieve carbon, zeolites (e.g., molecular sieve zeolites), polymers, resins, and any of these components or others having a gas-adsorbing material supported thereon (e.g., such as the various embodiments of sorbents described herein). Certain adsorbent materials may preferentially or selectively adhere particular species.

As used herein, the term "adsorption capacity" refers to a working capacity for an amount of a chemical species that an adsorbent material can adsorb under specific operating conditions (e.g., temperature and pressure). The units of adsorption capacity, when given in units of mg/g, correspond to milligrams of adsorbed gas per gram of sorbent.

Also as used herein, the term "particles" refers to a collection of discrete portions of a material each having a largest dimension ranging from 0.1 μm to 50 mm. The morphology of particles may be crystalline, semi-crystalline, or amorphous. The size ranges disclosed herein can be mean/average or median size, unless otherwise stated. It is noted also that particles need not be spherical, but may be in a form of cubes, cylinders, discs, or any other suitable shape as would be appreciated by one of ordinary skill in the art. "Powders" and "granules" may be types of particles.

Also as used herein, the term "monolith" refers to a single unitary block of a particular material. The single unitary block can be in the form of, e.g., a brick, a disk, or a rod and can contain channels for increased gas flow/distribution. In certain embodiments, multiple monoliths can be arranged together to form a desired shape. In certain embodiments, a monolith may have a honeycomb shape with multiple parallel channels each having a square shape, a hexagonal shape, or another shape.

Also as used herein, the term "dispersant" refers to a compound that helps to maintain solid particles in a state of suspension in a fluid medium, and inhibits or reduces agglomeration or settling of the particles in the fluid medium.

Also as used herein, the term "binder" refers to a material that, when included in a coating, layer, or film (e.g., a washcoated coating, layer, or film on a substrate), promotes the formation of a continuous or substantially continuous structure from one outer surface of the coating, layer, or film through to the opposite outer surface, is homogeneously or semi-homogeneously distributed in the coating, layer, or film, and promotes adhesion to a surface on which the coating, layer, or film is formed and cohesion between the surface and the coating, layer, or film.

Also as used herein, the terms "stream" or "flow" broadly refer to any flowing gas that may contain solids (e.g., particulates), liquids (e.g., vapor), and/or gaseous mixtures.

Also as used herein, the terms "volatile organic compounds" or "VOCs" refer to organic chemical molecules having an elevated vapor pressure at room temperature. Such chemical molecules have a low boiling point and a large number of the molecules evaporate and/or sublime at room temperature, thereby transitioning from a liquid or solid phase to a gas phase. Common VOCs include, but are not limited to, formaldehyde, benzene, toluene, xylene, ethylbenzene, styrene, propane, hexane, cyclohexane, limonene, pinene, acetaldehyde, hexaldehyde, ethyl acetate, butanol, and the like.

Also as used herein, the terms "unpurified air" or "unpurified air stream" refer to any stream that contains one or more pollutants at a concentration or content at or above a level that is perceived as nuisance, is considered to have adverse effects on human health (including short term and/or long term effects), and/or causes adverse effects in the operation of equipment. For example, in certain embodiments, a stream that contains formaldehyde at a concentration greater than 0.5 part formaldehyde per million parts of air stream calculated as an eight hour time weighted average concentration pursuant to "action level" standards set forth by the Occupational Safety & Health Administration is an unpurified air stream. In certain embodiments, a stream that contains formaldehyde at a concentration greater than 0.08 part formaldehyde per million parts of air stream calculated as an eight hour time weighted average concentration pursuant to national standards in China is an unpurified air stream. Unpurified air may include, but is not limited to, formaldehyde, ozone, carbon monoxide (CO), VOCs, methyl bromide, water, amine-containing compounds (e.g., ammonia), sulfur oxides, hydrogen sulfide, and nitrogen oxides.

Also as used herein, the terms "purified air" or "purified air stream" refer to any stream that contains one or more pollutants at a concentration or content that is lower than the concentration or content of the one or more pollutants in what would be considered an unpurified air stream.

Also as used herein, the term "substrate" refers to a material (e.g., a metal, semi-metal, semi-metal oxide, metal oxide, polymeric, ceramic, paper, pulp/semi-pulp products, etc.) onto or into which the catalyst is placed. In certain embodiments, the substrate may be in the form of a solid surface having a washcoat containing a plurality of catalytic particles and/or adsorbent particles. A washcoat may be formed by preparing a slurry containing a specified solids content (e.g., 30-50% by weight) of catalytic particles and/or adsorbent particles, which is then coated onto a substrate and dried to provide a washcoat layer. In certain embodiments, the substrate may be porous and the washcoat may be deposited outside and/or inside the pores.

Also as used herein, the term "nitrogen oxide" refers to compounds containing nitrogen and oxygen including but not limited to, nitric oxide, nitrogen dioxide, nitrous oxide, nitrosylazide, ozatetrazole, dinitrogen trioxide, dinitrogen tetroxide, dinitrogen pentoxide, trinitramide, nitrite, nitrate, nitronium, nitrosonium, peroxonitrite, or combinations thereof.

Also as used herein, the term "about," as used in connection with a measured quantity, refers to the normal variations in that measured quantity, as expected by the skilled artisan making the measurement and exercising a level of care commensurate with the objective of measurement and the precision of the measuring equipment. For example, when "about" modifies a value, it may be interpreted to mean that the value can vary by ±1%.

Surface area, as discussed herein, is determined by the Brunauer-Emmett-Teller (BET) method according to DIN ISO 9277:2003-05 (which is a revised version of DIN 66131), which is referred to as "BET surface area." The specific surface area is determined by a multipoint BET measurement in the relative pressure range from 0.05-0.3 $p/p_0$.

BRIEF DESCRIPTION OF THE DRAWINGS

The present disclosure is illustrated by way of example, and not by way of limitation, in the figures of the accompanying drawings, in which.

DETAILED DESCRIPTION

The embodiments described herein relate to adsorbent materials and systems incorporating the same for removing pollutants from interior air. More specifically, the adsorbent materials may be incorporated into indoor air, cabin air (e.g., aircraft cabin air), and vehicle ventilation systems, which may be designed to remove nitrogen oxides as well as other toxic chemical pollutants such as formaldehyde, pentanoic acid, acetaldehyde, toluene, ozone, carbon monoxide, sulfur dioxide, amines (including ammonia), sulfur compounds (including thiols), chlorinated hydrocarbons, and other alkali or acidic chemicals. The adsorbent material may comprise adsorbents that are, for example, physically blended with catalysts in one or more layers of a washcoat, or present in specific layers of a washcoat. The adsorbent materials may be able to adsorb and retain (i.e., with substantially zero desorption) pollutants such as nitrogen oxides (e.g., $NO_2$) below temperatures of 100° C. (e.g., 30-50° C.).

Embodiments of the present disclosure can be used to reduce, for example, $NO_2$ content of the interior air supplied to or treated within a building, aircraft, or non-aircraft vehicle. By blending adsorbent such as zeolites (e.g. dealuminated Y, high silica-to-alumina ratio (SAR) beta, ZSMs, etc.) with a basic metal oxide (e.g., such as one or more of copper oxide or zinc oxide), it is possible to advantageously capture compounds such as nitrogen oxides at ambient conditions and retain the nitrogen oxides at ambient conditions and up to, for example, temperatures of 100° C.

Figure 1:
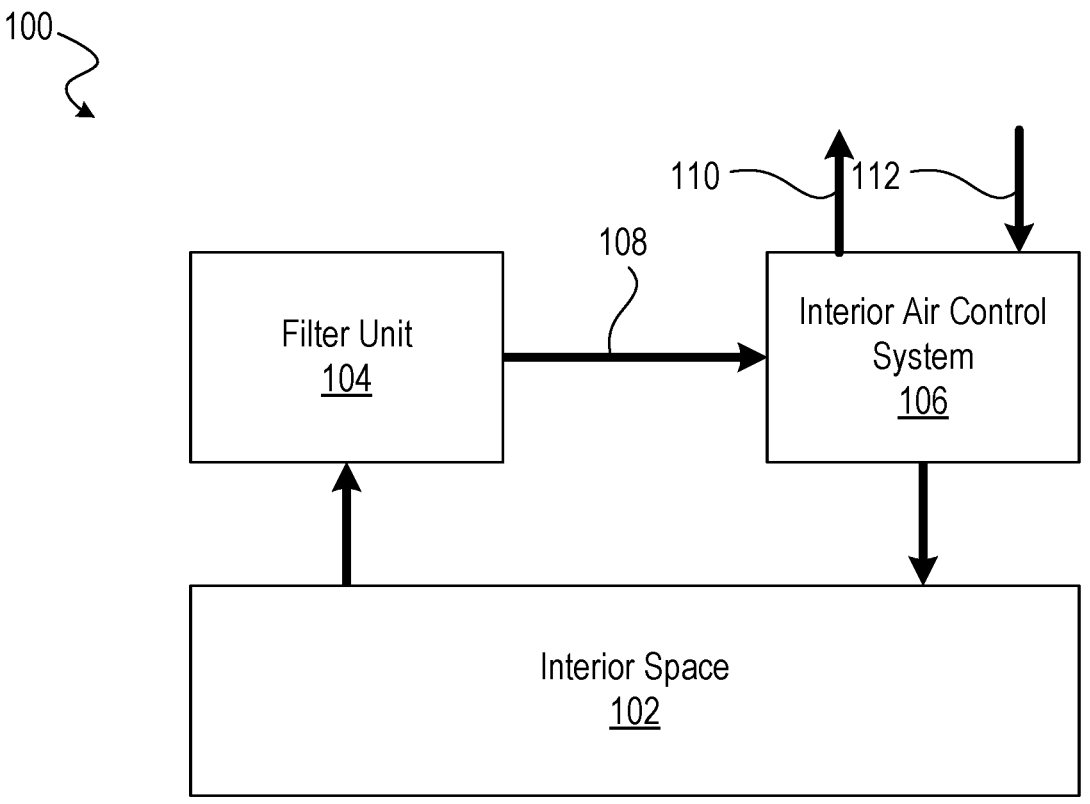
FIG. 1 depicts an illustrative air treatment system in accordance with an embodiment of the disclosure.

FIG. 1 depicts an illustrative air treatment system 100 in accordance with an embodiment of the disclosure. The system 100 includes a filter unit 104, which may be a part of or external to an interior air control system 106, such as a building heating, ventilation and air conditioning (HVAC) system, and aircraft ECS, or a non-aircraft ventilation system. As shown in FIG. 1, the filter unit 104 and the interior air control system 106 are fluidly coupled to each other and to the interior space 102 such that a recirculation air flow path 108 is established. As various pollutants, such as nitrogen oxides and odors accumulate within the interior space 102 102, interior air may be recirculated through the filter unit 104 to adsorb the pollutants using a filter device, as described herein. Purified air then passes through the interior air control system 106, which may be further filtered (e.g., to remove dust and other particulates) and may be heated or cooled before being recirculated back into the interior space 102. In some embodiments, the interior air control system 106 may include outbound air flow 110 and inbound air flow 112, which is filtered before entering the interior space 102. In certain embodiments, the filter unit 104 and the interior air control system 106 may be situated within the interior space 102, for example, in the form of an indoor (e.g., portable) air purifier.

The embodiment of the air-flow system 100 is merely illustrative, and it is to be understood that the embodiments of adsorbent materials and filter devices described herein may be incorporated into other systems for treating air, such as humidifying/dehumidifying systems, odor removal systems, VOC scrubbing systems, treatment systems for cathode air in fuel cell systems for cars, industrial systems, and other systems.

Figure 2A:
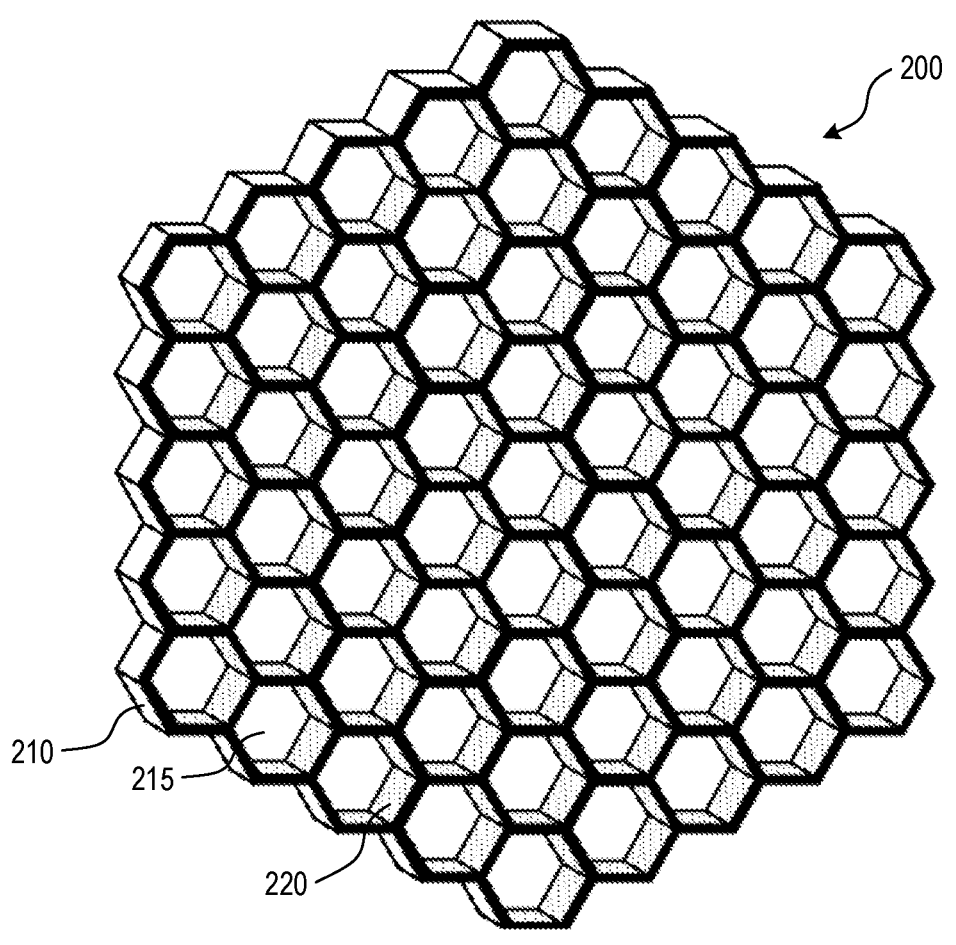
FIG. 2A depicts a cross-section of an exemplary substrate having a coating of an adsorbent material formed thereon in accordance with an embodiment of the disclosure.
Figure 2B:
FIG. 2B depicts a cross-section of a coating of an adsorbent material formed on a surface substrate in accordance with an embodiment of the disclosure.

FIGS. 2A and 2B depict a cross-sections of a coated substrate 200 formed in accordance with an embodiment of the disclosure. The coated substrate 200 includes a substrate 210 (e.g., a filter body), which is illustrated as being in a form of a honeycomb filter with air passageways 215 formed therethrough. It is to be understood that the honeycomb filter is merely illustrative, and that other filter shapes may be used. The coated substrate 200 further includes an adsorbent material 220 coated onto interior walls of the substrate 210. In some embodiments, one or more additional adsorbent material layers may be included above the adsorbent material 220. In some embodiments, the adsorbent material 220 may be in the form of a layer stack, with at least one layer comprising a different adsorbent material.

In certain embodiments, the substrate may be in the form of an open-pored foam, a honeycomb, or a nonwoven polymeric substrate. In certain embodiments, a material of the substrate may be ceramic (e.g., porous ceramic), metallic, polymeric foam, plastic, paper, fibrous (e.g., polymeric fiber), or combinations thereof. For example, in certain embodiments, the substrate may be formed from polyurethane fibers or a polyurethane foam. In certain embodiments, the substrate may be a metallic monolithic substrate, a ceramic monolithic substrate, a paper substrate, a polymer substrate, or a ceramic fiber monolithic substrate. In certain embodiments, the substrate is formed from a non-metallic and non-ceramic material. In other embodiments, the substrate is an aluminum substrate. In certain embodiments, the substrate may be an HVAC duct, an air filter, or a louver surface. In certain embodiments, the substrate may be a portable air filter, or a filter disposed in a vehicle, such as a motor vehicle, railed vehicle, watercraft, aircraft, or space craft.

In some embodiments, the substrate is selected from the group consisting of foams, monolithic materials, nonwovens, wovens, sheets, papers, twisted spirals, ribbons, structured media of extruded form, structured media of wound form, structured media of folded form, structured media of pleated form, structured media of corrugated form, structured media of poured form, structured media of bonded form, and combinations thereof.

In one embodiment, the substrate is an extruded media. In some embodiments, the extruded media is a honeycomb. The honeycomb may be in any geometrical shape including, but not limited to, round, cylindrical, or square. Furthermore, the cells of honeycomb substrates may be of any geometry.

In one embodiment, the substrate is a foam. In some embodiments, the foam has greater than about 10 pores per inch. In some embodiments, the foam has greater than about 20 pores per inch. In some embodiments, the foam has between about 15 and about 40 pores per inch. In some embodiments, the foam is a polyurethane. In some embodiments, the foam is a reticulated polyurethane. In some embodiments, the polyurethane is a polyether or polyester. In some embodiments, the substrate is a nonwoven.

In some embodiments, the substrate is a plastic. In some embodiments, the substrate is a thermoplastic polyolefin. In some embodiments, the substrate is a thermoplastic polyolefin containing a glass or mineral filler. In some embodiments, the substrate is a plastic selected from the group consisting of polypropylene, nylon-6, nylon-6,6, aromatic nylon, polysulfone, polyether sulfone, polybutylene terephthalate, polyphthalamide, polyoxymethylene, polycarbonate, polyvinylchloride, polyester, and polyurethane.

In certain embodiments, the adsorbent material comprises a zeolite and a basic metal oxide. In certain embodiments, the zeolite can be an aluminosilicate material or a silica-aluminophosphate material. Zeolites can be identified by 3-letter codes designated by the International Zeolite Association. In some embodiments the zeolite may include, for example, AEI, AFT, AFX, BEA, BEC, CHA, DDR, EMT, ERI, EUO, FAU, FER, GME, HEU, KFI, LEV, LTA, LTL, MAZ, MEL, MFI, MFS, MOR, MTN, MTT, MTW, MWW, NES, OFF, PAU, RHO, SFW, TON, UFI, or combinations thereof. In some embodiments the zeolites may include, for example, zeolite X, zeolite Y, ultrastable zeolite Y, ZSM-5 zeolite, offretite, beta zeolite, ferrierite, faujasite, chabazite, mordentite, clinoptilolite, silicalite, or combinations thereof. In some embodiments, the zeolite is a beta zeolite with a high silica-to-alumina ratio.

In certain embodiments, the zeolite comprises a zeolite selected from a group consisting of: AEI, BEA, BEC, CHA, EMT, FAU, FER, MFI, and combinations thereof. In certain embodiments, the zeolite comprises BEA zeolite.

In certain embodiments, the zeolite comprises micropores and mesopores. The micropores correspond to pores having widths of less than 20 Å. In some embodiments, the pores have widths from 2.0 Å to 6.7 Å, or from 4.0 Å to 6.5 Å. In some embodiments, the micropores account for at 70%, 80%, 90%, or greater of the total pore volume of the zeolite.

In some embodiments, a silica-to-alumina ratio of the zeolite is greater than about 100, greater than about 150, greater than about 200, or greater than about 250.

In some embodiments, the zeolite is in a form of zeolite particles. The zeolite particles may be characterized by an average d90 particle size from about 5 micrometers to about 25 micrometers, from about 10 micrometers to about 25 micrometers, or from about 15 micrometers to about 20 micrometers.

In certain embodiments, a total amount of zeolite, based on the total weight of the adsorbent material, may be present at about 1 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or within any range defined between any of these points (endpoint inclusive).

In certain embodiments, the basic metal oxide may comprise one or more of, for example, zinc oxide or copper oxide. A total amount of basic metal oxide, based on the total weight of the adsorbent material, may be present at about 1 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or within any range defined between any of these points (endpoint inclusive).

In certain embodiments, the adsorbent material comprises a combination of adsorbent materials, such as, for example zeolite particles mixed with one or more of silica gel, activated carbon, activated alumina, molecular sieves, resins, or catalytic material. In certain embodiments, the activated carbon may be synthetic activated carbon or based on or derived from wood, peat coal, coconut shell, lignite, petroleum pitch, petroleum coke, coal tar pitch, fruit pits, nuts, shells, sawdust, wood flour, synthetic polymer, natural polymer, and combinations thereof. Each of these additional components, such as activated carbon or catalytic material, may be present at about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, or within any range defined between any of these points (endpoint inclusive).

In certain embodiments, the catalytic material may comprise one or more of manganese, platinum, palladium, or cerium. In certain embodiments, the catalytic material comprises platinum particles having a diameter of greater than 2 nanometers. In certain embodiments, the catalytic material comprises platinum-modified alumina. In certain embodiments, the catalytic material comprises potassium-modified manganese oxide. In certain embodiments, the catalytic material may comprise a catalytic metal oxide. The catalytic metal oxide may include one or more of manganese oxide, cobalt oxide, molybdenum oxide, chromium oxide, copper oxide, or cerium oxide. In certain embodiments, the metal oxide may be a rare earth metal oxide.

In certain embodiments, the catalytic metal oxide is manganese oxide. In certain embodiments, the manganese oxide is amorphous or at least partially amorphous. In certain embodiments, the manganese oxide is semi-crystalline. In certain embodiments, the manganese oxide may comprise cryptomelane, birnessite, vernadite, manganese oxide polymorph I, poorly crystalline cryptomelane, amorphous manganese oxide, polymorphs thereof, amorphous manganese oxide, or mixtures thereof.

In certain embodiments, the adsorbent material may be formulated as a slurry and washcoated onto the substrate. In certain embodiments, a loading of the catalyst-adsorbent material on the substrate may range from about 0.5 g/in$^3$ to about 4 g/in$^3$ with respect to a volume of the substrate. In certain embodiments, the catalyst-adsorbent material may be coated onto the substrate and may form a single adsorbent layer on the solid substrate or a plurality of adsorbent layers. If a plurality of adsorbent layers is coated on the solid substrate, the layers may vary in their compositions or alternatively all adsorbent layers may have the same composition.

In certain embodiments, the adsorbent material is formed from porous particles in a powder form. In certain embodiments, an average size of the particles/powder ranges from about 1.0 μm to about 100 μm. In certain embodiments, the average size ranges from about 5.0 μm to about 50 μm.

In certain embodiments, a BET surface area of the adsorbent material is from about 20 m$^2$/g to about 5,000 m$^2$/g, or greater. In certain embodiments, the BET surface area of the adsorbent is from about 20 m$^2$/g to about 4,000 m$^2$/g, about 20 m$^2$/g to about 3,000 m$^2$/g, about 20 m$^2$/g to about 2,500 m$^2$/g, about 20 m$^2$/g to about 2,000 m$^2$/g, about 20 m$^2$/g to about 1,000 m$^2$/g, about 20 m$^2$/g to about 500 m$^2$/g, about 20 m$^2$/g to about 300 m$^2$/g, about 100 m$^2$/g to about 5,000 m$^2$/g, about 100 m$^2$/g to about 4,000 m$^2$/g, about 100 m$^2$/g to about 3,000 m$^2$/g, about 100 m$^2$/g to about 2,500 m$^2$/g, about 100 m$^2$/g to about 2,000 m$^2$/g, about 100 m$^2$/g to about 1,000 m$^2$/g, about 100 m$^2$/g to about 500 m$^2$/g, about 100 m$^2$/g to about 300 m$^2$/g, about 300 m$^2$/g to about 5,000 m$^2$/g, about 300 m$^2$/g to about 4,000 m$^2$/g, about 300 m$^2$/g to about 3,000 m$^2$/g, about 300 m$^2$/g to about 2,500 m$^2$/g, about 300 m$^2$/g to about 2,000 m$^2$/g, about 300 m$^2$/g to about 1,000 m$^2$/g, about 300 m$^2$/g to about 500 m$^2$/g, about 750 m$^2$/g to about 5,000 m$^2$/g, about 750 m$^2$/g to about 4,000 m$^2$/g, about 750 m$^2$/g to about 3,000 m$^2$/g, about 750 m$^2$/g to about 2,500 m$^2$/g, about 750 m$^2$/g to about 2,000 m$^2$/g, about 750 m$^2$/g to about 1,000 m$^2$/g, about 1,200 m$^2$/g to about 5,000 m$^2$/g, about 1,200 m$^2$/g to about 4,000 m$^2$/g, about 1,200 m$^2$/g to about 3,000 m$^2$/g, about 1,200 m$^2$/g to about 2,500 m$^2$/g, about 1,500 m$^2$/g to about 5,000 m$^2$/g, about 1,750 m$^2$/g to about 5,000 m$^2$/g, about 2,000 m$^2$/g to about 5,000 m$^2$/g, about 2,500 m$^2$/g to about 5,000 m$^2$/g, about 3,000 m$^2$/g to about 5,000 m$^2$/g, about 3,500 m$^2$/g to about 5,000 m$^2$/g, or about 4,000 m$^2$/g to about 5,000 m$^2$/g.

In order to increase capacity of the porous support utilized in the embodiments of the present disclosure, the adsorbent can be activated. The activation may include subjecting the adsorbent (e.g., particles) to various conditions including, but not limited to, ambient temperature, vacuum, an inert gas flow, or any combination thereof, for a sufficient time to activate the adsorbent. In certain embodiments, the adsorbent may be activated by calcining.

In some embodiments, the slurry may further comprise a binder, which may help promote adhesion of the adsorbent material to the substrate. In some embodiments, the binder can crosslink with itself to provide improved adhesion. The presence of the binder may enhance the integrity of hydrocarbon adsorbent, improve its adhesion to the substrate, and provide structural stability under vibrational conditions encountered in motor vehicles.

The binder may comprise additives to improve water resistance and improve adhesion. Binders typical for use in the formulation of slurries include, but are not limited to, the following: organic polymers; sols of alumina, silica or zirconia; inorganic salts, organic salts, and/or hydrolysis products of aluminum, silica, or zirconium; hydroxides of aluminum, silica, or zirconium; organic silicates that are hydrolyzable to silica; and mixtures thereof. In some embodiments, the binder comprises a zirconium salt (e.g., zirconium acetate). In some embodiments, the binder is an organic polymer. The organic polymer may be a thermosetting or thermoplastic polymer and may be plastic or elastomeric. The binder may be, for example, an acrylic/styrene copolymer latex, a styrene-butadiene copolymer latex, a polyurethane, or any mixture thereof. In some embodiments, the polymeric binder comprises an acrylic/styrene acrylic copolymer latex, such as a hydrophobic styrene-acrylic emulsion. In some embodiments, the binder is selected from acrylic/styrene copolymer latex, a styrene-butadiene copolymer latex, a polyurethane, and mixtures thereof. In some embodiments, the binder comprises an acrylic/styrene copolymer latex and polyurethane dispersion. The polymeric binder may contain suitable stabilizers and age resistors known in the art. In some embodiments, the binder is a thermosetting, elastomeric polymer introduced as a latex into a slurry (e.g., an aqueous slurry) prior to coating the slurry onto the substrate.

Examples of suitable polymeric binders may include but are not limited to: polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), fluorinated polymers such as poly (tetrafluoroethylene), polyvinylidene fluoride, poly (vinylfluoride) and chloro/fluoro copolymers such as ethylene chlorotrifluoroethylene copolymer, polyamide, phenolic resins, polyurethane, acrylic/styrene acrylic copolymer latex and silicone polymers.

In certain embodiments, the binder, or mixture of binders, is present from about 5 wt. % to about 50 wt. %, based on the total weight of the hydrocarbon adsorbent when dried and deposited onto the substrate. In certain embodiments, the polymeric binder is present from about 5 wt. % to about 30 wt. %, about 10 wt. % to about 30 wt. %, from about 15 wt. % to about 30 wt. %, from about 5 wt. % to about 25 wt. %, from about 5 wt. % to about 20 wt. %, from about 5 wt. % to about 15 wt. %, from about 10 wt. % to about 20 wt. %, or from about 15 wt. % to about 20 wt. %.

Figure 3:
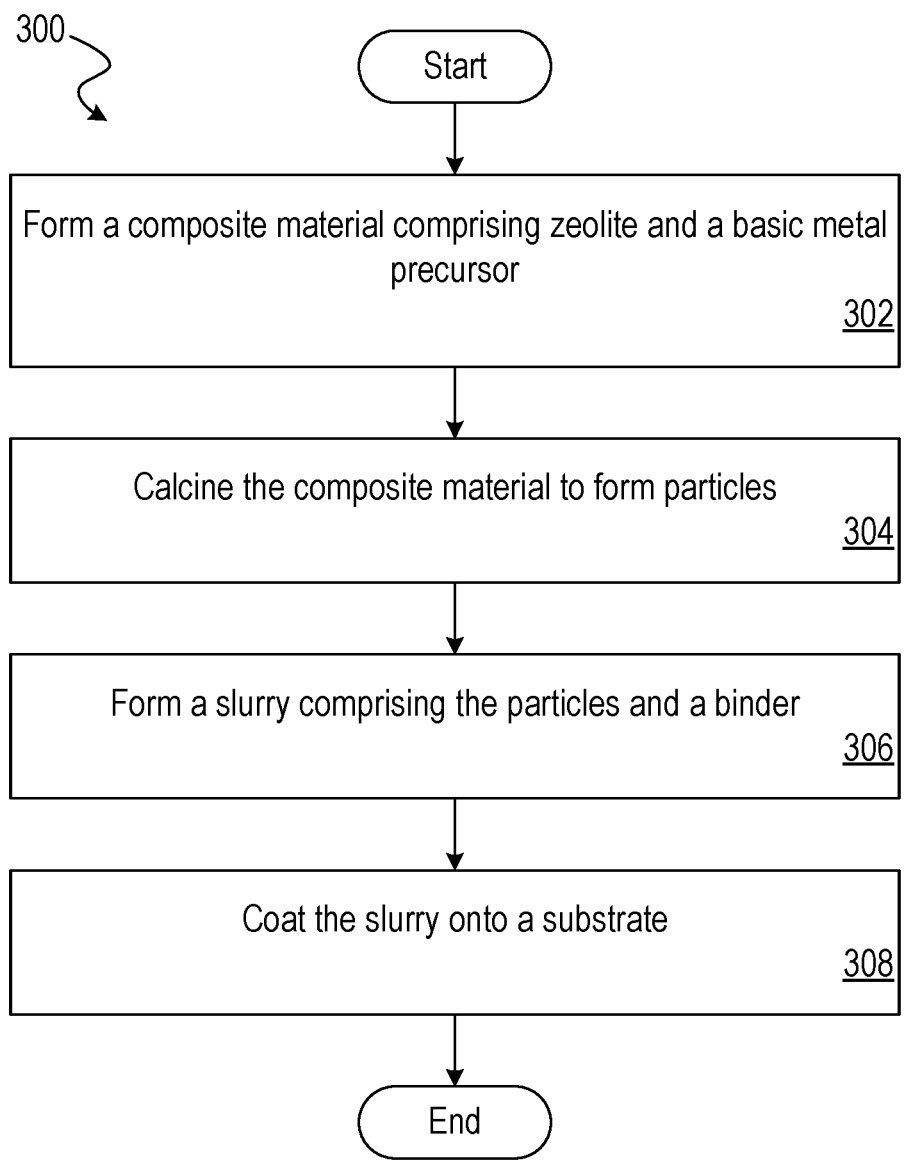
FIG. 3 is a flow diagram illustrating a method of forming a filter device adapted for removal and retention of $NO_2$ from interior air in accordance with an embodiment of the disclosure.

FIG. 3 is a flow diagram illustrating a method 300 of forming a filter device adapted for removal and retention of NO$_2$ from interior air in accordance with an embodiment of the disclosure. The method 300 begins at block 302, a composite material of a zeolite and a basic metal precursor is formed, for example, by dissolving the materials in an aqueous solution. In certain embodiments, block 302 is an incipient wetness impregnation process that impregnates the zeolite with the basic metal precursor. In certain embodiments, the basic metal precursor comprises one or more of zinc acetate or copper acetate.

At block 304, the composite material is calcined to form particles comprising the zeolite and a basic metal oxide formed from the basic metal precursor.

At block 306, a slurry is formed by mixing the calcined particles and a binder in, for example, an aqueous carrier.

In some embodiments, the slurry may contain additional additives, such as thickeners, dispersants, surfactants, biocides, antioxidants, and the like, which may be added to the slurry prior to forming the adsorbent material on the substrate. A thickener, for example, makes it possible to achieve a sufficient amount of coating on relatively low surface area substrates. The thickener may also serve in a secondary role by increasing slurry stability by steric hindrance of the dispersed particles. It may also aid in the binding of the coating surface. Exemplary thickeners include xanthan gum thickener or a carboxymethyl-cellulose thickener. Kelzan® CC (available from CP Kelco) is one such exemplary xanthan thickener.

In some embodiments, the slurry contains a dispersant. The dispersant may be anionic, cationic, or non-ionic, and may be utilized in an amount of about 0.1 wt. % to about 10 wt. %, based on the weight of the hydrocarbon adsorbent. Suitable dispersants include, but are not limited to, poly-acrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate, and mixtures thereof. In some embodiments, the dispersant is a low molecular weight polyacrylic acid in which many of the protons on the acid are replaced with sodium. In some embodiments, the dispersant is a polycarboxylate ammo-nium salt. In certain embodiments, the dispersant includes one or more of an anionic surfactant, a cationic surfactant, a zwitterionic surfactant, or a nonionic surfactant. In certain embodiments, the dispersant is a nonionic acrylic copoly-mer. In some embodiments, the dispersant is a hydrophobic copolymer pigment dispersant. An exemplary dispersant is Tamol™ 165A (Trademark of Dow Chemical). While increasing the slurry pH or adding anionic dispersant alone may provide enough stabilization for the slurry mixture, improved results may be obtained when both an increased pH and anionic dispersant are used. In some embodiments, the dispersant is a non-ionic surfactant such as Surfynol® 420 (Air Products and Chemicals, Inc). In some embodi-ments, the dispersant is an acrylic block copolymer such as Dispex® Ultra PX 4575 (BASF).

In certain embodiments, the slurry further includes an oxidant, which may improve removal efficiency of nitrogen oxides. The oxidant may be selected from nitric acid, hypochlorite, a persulfate, a peroxide, permanganate, or a chlorate.

In certain embodiments, the slurry further includes an alkaline component, such as a hydroxide, ammonia, or a carbonate, which may improve slurry stabilization. In cer-tain embodiments, a pH of the slurry may be adjusted between 2 and 12, or between 4 and 10.

At block 308, the slurry is deposited onto a substrate, such as a filter body, and dried to form the filter device. In certain embodiments, drying is performed at a temperature from about 80° C. to about 250° C.

The substrate may comprise a material selected from polymeric foam, polymeric fiber, nonwoven fabric, a ceramic, or a pulp product (e.g., paper). In certain embodi-ments, the substrate comprises a polymeric foam comprising polyurethane. In certain embodiments, the substrate is in a form of a honeycomb. In certain embodiments, the substrate is metallic (e.g., aluminum).

In some embodiments, the slurry is washcoated onto the substrate a loading of the hydrocarbon adsorbent on the substrate is less than 1 g/in³. In some embodiments, the loading is from 0.5 g/in³ to 1 g/in³, or from 0.75 g/in³ to 1 g/in³. In some embodiments, the loading is greater than 1 g/in³. In some embodiments, the loading is from 1 g/in³ to 1.25 g/in³, from 1.25 g/in³ to 1.5 g/in³, from 1.5 g/in³ to 1.75 g/in³, or from 1.75 g/in³ to 2 g/in³.

In some embodiments, a coating thickness of adsorbent material after drying is greater than 50 micrometers and less than about 500 micrometers, less than 400 micrometers, less than 300 micrometers, less than 200 micrometers, or less than 100 micrometers.

It is noted that the blocks of method 300 are not limiting, and that, in certain embodiments, some or all of the blocks of their respective methods may be performed. In certain embodiments, one or more of the blocks may be performed substantially simultaneously. Some blocks may be omitted entirely or repeated.

ILLUSTRATIVE EXAMPLES

The following examples are set forth to assist in under-standing the disclosure and should not, of course, be con-strued as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Example 1

18.2 g of copper acetate was dissolved in 100 mL of water. 63 g of beta zeolite, SAR-300 was then impregnated by the incipient wetness method with the metal salt solution. Upon impregnation, the material was calcined at 550° C. for 5 hours. 49.7 g of the calcined material was then added into 75 mL of water to form a slurry. The slurry was milled so that the d90 was 6.2 µm. 4.7 g of styrene acrylic binder was added and then mixed for 15 min. 0.85"(d)×1" (h) aluminum honeycomb substrates were then coated to achieve a loading of 1.01 g/in³. The coated monolith is then dried at 90° C. for 2 hours.

Example 2

75 g of copper nitrate was dissolved in 80 mL of water. 190 g of beta zeolite, SAR-300, was then impregnated by the incipient wetness method with the metal salt solution. Upon impregnation, the material was calcined at 550° C. for 5 hours. 49.0 g of the calcined material was then added into 75 mL of water to form a slurry. The slurry was milled so that the d90 was 27 µm. 4.9 g of styrene acrylic binder was added and then mixed for 15 min. 0.85"(d)×1" (h) aluminum honeycomb substrates were then coated to achieve a loading of 1.00 g/in³. The coated monolith is then dried at 90° C. for 2 hours.

Example 3

50.3 g of zinc acetate was dissolved in 120 mL of water. 126 g of beta zeolite, SAR-300, was then impregnated by the incipient wetness method with the metal salt solution. Upon impregnation, the material was calcined at 550° C. for 5 hours. 47.9 g of the calcined material was then added into 72 mL of water to form a slurry. The slurry was milled so that the d90 was less than 20 µm. 4.9 g of styrene acrylic binder was added and then mixed for 15 min. 0.85"(d)×1" (h) aluminum honeycomb 230 cpsi substrates were then coated to achieve a loading of 0.99 g/in³. The coated monolith is then dried at 90° C. for 2 hours.

Example 4

75 g of copper nitrate was dissolved in 80 ml of water. 190 g of beta zeolite, SAR-300, was then impregnated by the incipient wetness method with the metal salt solution. Upon impregnation, the material was calcined at 550° C. for 5 hours. 49.0 g of the calcined material was then added into 75 mL of water to form a slurry. The slurry was milled so that the d90 was 27 μm. 4.9 g of styrene acrylic binder was added and then mixed for 15 min. 0.85"(d)×1" (h) aluminum honeycomb substrates were then coated to achieve a loading of 1.00 g/in³. The coated monolith is then dried at 90° C. for 2 hours.

Example 5

45 g of copper nitrate trihydrate salt was dissolved in 25 mL of water. 126 g of zeolite ZSM-5, SAR-280, was then impregnated by the incipient wetness method with the metal salt solution. Upon impregnation, the material was calcined at 550° C. for 5 hours. 95.32 g of the calcined material was then added into 95.1 mL of water to form a slurry. The slurry was milled so that the d90 was less than 20 μm. 9.6 g of styrene acrylic binder was added and then mixed for 15 min. 0.85" (d)×1" (h) aluminum honeycomb 230 cpsi substrates were then coated to achieve a loading of 1.03 g/in³. The coated monolith is then dried at 90° C. for 2 hours.

Example 6

45 g of copper nitrate trihydrate salt was dissolved in 25 mL of water. 126 g of zeolite ZSM-5, SAR-17, was then impregnated by the incipient wetness method with the metal salt solution. Upon impregnation, the material was calcined at 550° C. for 5 hours. 95 g of the calcined material was then added into 95 mL of water to form a slurry. The slurry was milled so that the d90 was less than 20μm. 9.6 g of styrene acrylic binder was added and then mixed for 15 min. 0.85" (d)×1" (h) aluminum honeycomb substrates 230 cpsi were then coated to achieve a loading of 1.03 g/in³. The coated monolith is then dried at 90° C. for 2 hours.

Testing

Testing conditions: An unpurified air flow stream (16.6 L/min) having between 2.5-3.5 ppm $NO_2$, 0.5 or 1.5% water in air at 18-23° C. was directed over the aluminum honeycomb catalyst. The initial percentage $NO_2$ removed was calculated with the following equation:

$$1-([NO_2 \text{ outlet concentration}]/ [NO_2 \text{ inlet concentration}])\times100.$$

The cumulative $NO_2$ removed is calculated as follows:

$$\left\{\left\{\int_{time(min)}\left[\text{Inlet}\frac{NO2 \text{ ppm}}{1000000}\right]dt - \int_{time(min)}\left[\text{Outlet}\frac{NO2 \text{ ppm}}{1000000}\right]dt\right\}\times\right.$$

$$46.01 \text{ g/mol} \times 24.15 \text{ moles/L} \times \text{flow rate (in L/min)}.$$

Cumulative $NO_2$ removed is reported as the point when removal rate decreases to 20% and is normalized to $NO_2$ removed per gram of material.

Figure 4:
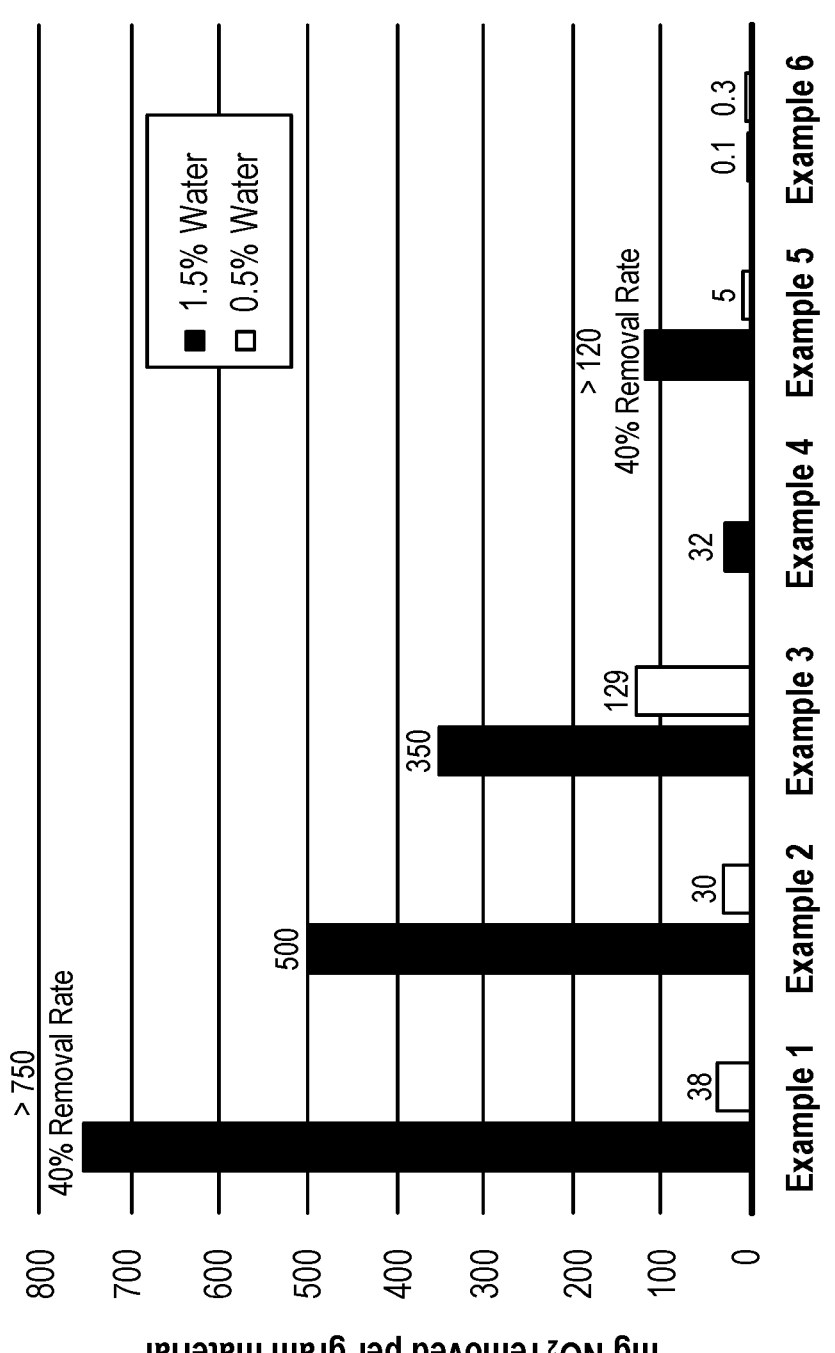
FIG. 4 is a plot showing $NO_2$ removal per mass of adsorbent material for examples in accordance with embodiments of the disclosure.

FIG. 4 is a plot showing cumulative $NO_2$ removal per mass of adsorbent material for the various examples.

Figure 5:
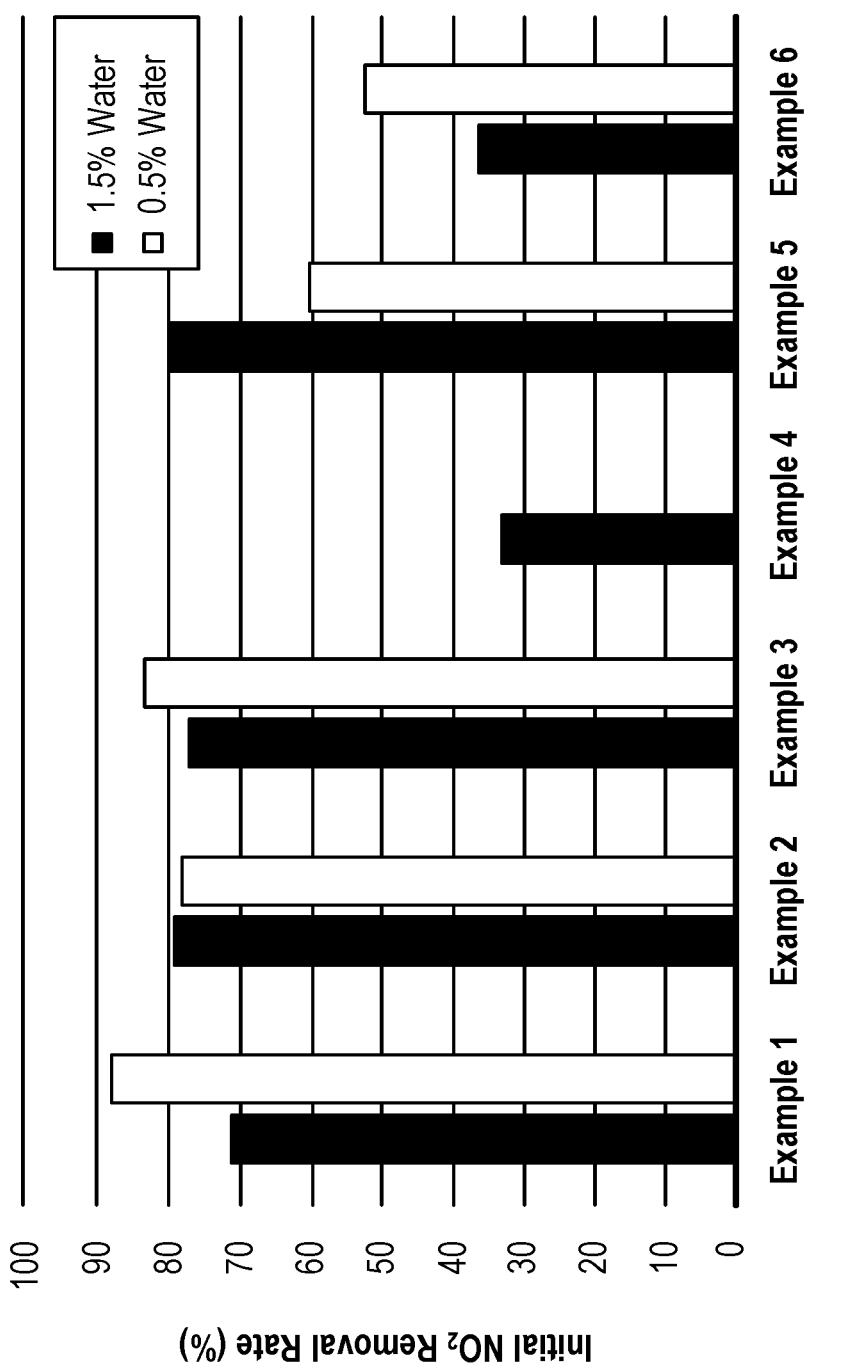
FIG. 5 is a plot showing initial $NO_2$ removal rate for examples in accordance with embodiments of the disclosure.

FIG. 5 is a plot showing initial $NO_2$ removal rate for the various examples. Examples 1-3 show consistent performance for 0.5% and 1.5% water conditions, with initial $NO_2$ removal rates above 70%.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the use of the terms "a," "an," "the," and similar referents in the context of describing the materials and methods discussed herein (especially in the context of the following claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Reference throughout this specification to "one embodiment," "certain embodiments," "one or more embodiments," "an embodiment," or "some embodiments" means that a particular feature, structure, material, or characteristic described in connection with the embodiment is included in at least one embodiment of the present disclosure. Thus, the appearances of the phrases such as "in one or more embodiments," "in certain embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. A filter device adapted for removal and retention of $NO_2$ from interior air at temperatures below 100° C., the filter device comprising:

a substrate; and an adsorbent material coated onto the substrate, the adsorbent material comprising a zeolite and a basic metal oxide comprising a copper oxide, wherein the basic metal oxide is present at a loading of about 5 wt. % to about 20 wt. % based on the total weight of the adsorbent material.

2. The filter device of claim 1, wherein the substrate is formed from a non-metallic and non-ceramic material.

3. The filter device of claim 1, wherein the substrate is a foam substrate or a nonwoven polymeric substrate.

4. The filter device of claim 1, wherein the substrate is an aluminum substrate.

5. The filter device of claim 1, wherein the zeolite comprises a zeolite selected from a group consisting of: AEI, BEA, BEC, CHA, EMT, FAU, FER, MFI, and combinations thereof.

6. The filter device of claim 1, wherein the zeolite comprises BEA zeolite.

7. The filter device of claim 1, wherein the interior air is recirculated air.

8. The filter device of claim 1, wherein the zeolite is a beta zeolite, and wherein a silica-to-alumina ratio (SAR) of the beta zeolite is about 200 or greater.

9. The filter device of claim 1, wherein the zeolite is a beta zeolite, and wherein a silica-to-alumina ratio (SAR) of the beta zeolite is about 300 or greater.

10. The filter device of claim 1, wherein the adsorbent material further comprises a binder.

11. The filter device of claim 10, wherein the binder is a polymeric binder selected from a group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly(phenylene sulfide), poly(tetrafluoroethylene), polyvinylidene fluoride, poly(vinylfluo-ride), ethylene chlorotrifluoroethylene copolymer, polyamide, phenolic resins, polyurethane, acrylic/styrene acrylic copolymer latex, silicone polymers, and combinations thereof.

12. The filter device of claim 10, wherein the binder comprises an alumina or zirconia binder.

13. The filter device of claim 1, wherein the adsorbent material further comprises one or more of silica gel, activated carbon, activated alumina, molecular sieves, resins, or catalytic material.

14. The filter device of claim 1, wherein the filter device is incorporated into an interior air control system selected from a building heating, ventilation and air conditioning (HVAC) system, an aircraft environmental control system, a non-aircraft vehicle ventilation system, and an indoor air purifier.

15. The filter device of claim 1, wherein the filter device is adapted for a cumulative $NO_2$ removal of greater than 120, 350, 500, or 750 milligrams per gram of the adsorbent material when contacting air at 18-23° C. with a water content of 1.5%, wherein the cumulative $NO_2$ removal corresponds to $NO_2$ removed over a duration from initial removal efficiency of the adsorbent material until 20% of the initial removal efficiency.

16. A method for removal and retention of $NO_2$ from an interior air flow comprising a recirculated air supply, the method comprising:

contacting the interior air flow with an adsorbent material adapted to reduce the $NO_2$ concentration of the recirculated air supply, the adsorbent material comprising a zeolite and a basic metal oxide comprising a copper oxide, wherein the basic metal oxide is present at a loading of about 5 wt. % to about 20 wt. % based on the total weight of the adsorbent material.

17. An air purification system for removal and retention of $NO_2$ from interior air, the air purification system comprising:

a substrate; and an adsorbent material coated onto the substrate, the adsorbent material comprising a beta zeolite impregnated with a basic metal oxide comprising a copper oxide, wherein the basic metal oxide is present at a loading of about 5 wt. % to about 20 wt. % based on the total weight of the adsorbent material.

* * * * *